(12) United States Patent
Walker (10) Patent No.: US 8,740,177 B2
(45) Date of Patent: Jun. 3, 2014

(54) ECCENTRIC DIAPHRAGM VALVE

(75) Inventor: Samuel C. Walker, Green Valley, AZ (US)

(73) Assignee: Rain Bird Corporation, Azusa, CA (US)

( * ) Notice: Subject to any disclaimer, the term of this patent is extended or adjusted under 35 U.S.C. 154(b) by 172 days.

(21) Appl. No.: 13/250,459

(22) Filed: Sep. 30, 2011

(65) Prior Publication Data

US 2013/0009086 A1    Jan. 10, 2013

Related U.S. Application Data

(60) Provisional application No. 61/504,623, filed on Jul. 5, 2011.

(51) Int. Cl.
 *F16K 31/12* (2006.01)
(52) U.S. Cl.
 USPC ........ 251/30.02; 251/30.01; 251/61; 251/331
(58) Field of Classification Search
 USPC ........ 251/30.01, 30.02, 28, 25, 61.1, 61, 331, 251/335.2, 333
 See application file for complete search history.

(56) References Cited

U.S. PATENT DOCUMENTS

| | | | |
|---|---|---|---|
| 179,698 A | 7/1876 | Hagar | |
| 269,886 A | 1/1883 | Semple | |
| 306,972 A | 10/1884 | Stiles | |
| 766,420 A | 8/1904 | Calley | |
| 954,313 A | 4/1910 | Lillyman | |
| 1,112,820 A | 10/1914 | McIssac | |
| 1,126,248 A | 1/1915 | Mauck et al. | |
| 1,279,857 A | 9/1918 | Gibson | |
| 1,377,633 A | 5/1921 | Sidwell | |
| 1,566,375 A | 12/1925 | Coatalen | |
| 1,781,032 A | 1/1929 | Redfield | |
| 1,764,712 A | 6/1930 | Brackett et al. | |
| 1,894,679 A | 6/1931 | Folmsbee | |
| 2,037,707 A | 4/1936 | Davis et al. | |
| 2,102,076 A | 12/1937 | Johnson | |
| 2,158,787 A | 5/1939 | Lorenz et al. | |

(Continued)

FOREIGN PATENT DOCUMENTS

| | | |
|---|---|---|
| CA | 2606464 | 10/2007 |
| EP | 1245258 | 10/2002 |

(Continued)

OTHER PUBLICATIONS

Bermad Water Control Solutions, Bermad Irrigation, 100 Series—hYflow High Performance Valves Catalog, 2009, 12 pp.

(Continued)

*Primary Examiner* — John K Fristoe, Jr.
*Assistant Examiner* — Umashankar Venkatesan
(74) *Attorney, Agent, or Firm* — Fitch, Even, Tabin & Flannery, LLP (57) ABSTRACT

An irrigation valve has a valve body with an inlet passage, an outlet passage, and a valve seat intermediate the inlet passage and the outlet passage. A diaphragm includes a valve seat engaging portion that cooperates with the valve seat to control flow through the valve. The valve seat and the valve seat engaging portion of the diaphragm are offset relative to the inlet passage to improve flow through the valve to reduce pressure and energy loss.

18 Claims, 7 Drawing Sheets

(56) References Cited

U.S. PATENT DOCUMENTS

| | | |
|---|---|---|
| 2,228,588 A | 1/1941 | Ray |
| 2,232,502 A | 2/1941 | Wittmann |
| 2,235,304 A | 3/1941 | Toussaint |
| 2,342,347 A | 2/1944 | Jacobsen |
| 2,388,868 A | 11/1945 | Ray |
| 2,412,490 A | 12/1946 | Biggle |
| 2,463,235 A | 3/1949 | Andrews |
| 2,477,587 A | 8/1949 | Doutt |
| 2,504,057 A | 4/1950 | Trefil |
| 2,587,569 A | 2/1952 | Giauque |
| 2,716,017 A | 8/1952 | Linker |
| 2,638,109 A | 5/1953 | Wahlmark |
| 2,936,998 A | 9/1954 | Loepsinger |
| 2,746,471 A | 5/1956 | Cobb |
| 2,860,015 A | 11/1958 | Matterson |
| 2,871,790 A | 2/1959 | Weills |
| 2,873,043 A | 2/1959 | Folmsbee |
| 2,929,645 A | 3/1960 | Meckenstock |
| 3,067,764 A | 4/1960 | Geary |
| 2,940,474 A | 6/1960 | Webster |
| 2,953,248 A | 9/1960 | Troland |
| 3,103,342 A | 9/1963 | Boteler |
| 3,239,148 A | 3/1966 | Entyre |
| 3,279,749 A | 10/1966 | Fleckenstein et al. |
| 3,336,843 A | 8/1967 | Griswold |
| 3,339,583 A | 9/1967 | Fleckenstein et al. |
| 3,346,004 A | 10/1967 | Costello |
| 3,357,567 A | 12/1967 | Wake |
| 3,379,406 A * | 4/1968 | Greer ............... 251/45 |
| 3,399,695 A | 9/1968 | Stehlin |
| 3,476,353 A | 11/1969 | Stampfli |
| 3,477,693 A | 11/1969 | Bezanis |
| 3,477,748 A | 11/1969 | Tinsley |
| 3,511,472 A | 5/1970 | Zimmerman |
| 3,517,714 A | 6/1970 | Desbarats |
| 3,550,775 A | 12/1970 | Cooley |
| 3,556,464 A | 1/1971 | Griswold |
| 3,578,284 A | 5/1971 | Martini |
| 3,599,866 A | 8/1971 | Bolton |
| 3,623,607 A | 11/1971 | Loos |
| 3,628,770 A | 12/1971 | Rost |
| 3,641,817 A | 2/1972 | Dory |
| 3,653,348 A | 4/1972 | Baumhaft |
| 3,662,953 A | 5/1972 | Wiens |
| 3,664,125 A | 5/1972 | Strange |
| 3,668,412 A | 6/1972 | Vrana et al. |
| 3,693,611 A * | 9/1972 | Ploss ............... 600/498 |
| 3,711,689 A | 1/1973 | Park |
| 3,719,343 A * | 3/1973 | Werra ............... 251/61.1 |
| 3,721,505 A | 3/1973 | Garnett |
| 3,723,987 A | 3/1973 | Barone, Jr. et al. |
| 3,750,001 A | 7/1973 | McCloskey |
| 3,754,651 A | 8/1973 | Lannoch |
| 3,779,514 A | 12/1973 | OConnor, Jr. |
| 3,782,634 A | 1/1974 | Herman |
| 3,807,220 A | 4/1974 | Ottenstein et al. |
| 3,822,591 A | 7/1974 | Li |
| 3,850,802 A | 11/1974 | Berger |
| 3,882,723 A | 5/1975 | Wickham |
| 3,898,471 A | 8/1975 | Schera, Jr. |
| 3,917,130 A | 11/1975 | Nigorikawa et al. |
| 3,959,140 A | 5/1976 | Legras |
| 3,972,515 A | 8/1976 | Mercatoris |
| 3,987,662 A | 10/1976 | Hara et al. |
| 4,003,837 A | 1/1977 | Osborne |
| 4,009,395 A | 2/1977 | Long |
| 4,019,984 A | 4/1977 | Mohn |
| 4,029,295 A | 6/1977 | Wassmer |
| 4,039,452 A | 8/1977 | Fernandez |
| 4,045,345 A | 8/1977 | Drori |
| 4,058,286 A | 11/1977 | Berger |
| 4,060,483 A | 11/1977 | Barzuza |
| 4,081,171 A | 3/1978 | Morgan |
| 4,135,696 A | 1/1979 | Saarem |
| 4,142,367 A | 3/1979 | Guisti |
| 4,145,885 A | 3/1979 | Solell |
| 4,180,236 A | 12/1979 | Saarem |
| 4,217,116 A | 8/1980 | Seever |
| 4,235,414 A | 11/1980 | Lis |
| 4,251,053 A * | 2/1981 | Wurzer ............... 251/331 |
| 4,260,901 A | 4/1981 | Woodbridge |
| 4,271,018 A | 6/1981 | Drori |
| 4,278,540 A | 7/1981 | Drori |
| 4,280,680 A | 7/1981 | Payne |
| 4,301,992 A | 11/1981 | Karbo |
| 4,304,260 A * | 12/1981 | Turner et al. ............... 137/613 |
| 4,308,746 A | 1/1982 | Covington |
| 4,311,170 A | 1/1982 | Dolan |
| 4,316,480 A | 2/1982 | Kah, Jr. |
| 4,317,048 A | 2/1982 | Kime |
| 4,336,918 A | 6/1982 | Karbo |
| 4,337,158 A | 6/1982 | Bodine |
| 4,337,786 A | 7/1982 | Myers |
| 4,352,025 A | 9/1982 | Troyen |
| 4,360,037 A | 11/1982 | Kendall |
| 4,392,060 A | 7/1983 | Ivy |
| 4,418,886 A | 12/1983 | Holzer |
| 4,477,051 A | 10/1984 | Ben-Yehuda |
| 4,490,621 A | 12/1984 | Watabe |
| 4,492,247 A | 1/1985 | Lockwood |
| 4,505,450 A | 3/1985 | Saarem |
| 4,508,136 A | 4/1985 | Kah, Jr. |
| 4,518,955 A | 5/1985 | Meyer |
| 4,530,463 A | 7/1985 | Hiniker |
| 4,537,387 A * | 8/1985 | Danby et al. ............... 251/331 |
| 4,560,884 A | 12/1985 | Whittecar |
| 4,599,858 A | 7/1986 | LaStella |
| 4,655,910 A | 4/1987 | Tabor |
| 4,655,911 A | 4/1987 | Tabor |
| 4,662,399 A | 5/1987 | Buchner et al. |
| 4,671,485 A | 6/1987 | Saarem |
| 4,697,786 A | 10/1987 | Kennedy |
| 4,731,545 A | 3/1988 | Lerner |
| 4,736,889 A | 4/1988 | Stephenson |
| 4,776,772 A | 10/1988 | Everett |
| 4,789,189 A | 12/1988 | Robertson |
| 4,805,862 A | 2/1989 | Wissman |
| 4,818,402 A | 4/1989 | Steiner |
| 4,838,310 A | 6/1989 | Scott |
| 4,859,157 A | 8/1989 | Adler |
| 4,887,516 A | 12/1989 | Scott |
| 4,893,645 A | 1/1990 | Augustinas et al. |
| 4,911,401 A | 3/1990 | Holcomb |
| 4,917,357 A | 4/1990 | Danko |
| 4,919,801 A | 4/1990 | Hobson, Jr. |
| 4,944,249 A | 7/1990 | Takeuchi et al. |
| 4,951,554 A | 8/1990 | Scott |
| 4,955,582 A | 9/1990 | Baumann |
| 4,981,261 A | 1/1991 | Bergmann |
| 5,002,086 A | 3/1991 | Linder |
| 5,004,014 A | 4/1991 | Bender |
| 5,028,017 A | 7/1991 | Simmons |
| 5,038,268 A | 8/1991 | Krause |
| 5,040,409 A | 8/1991 | Kiewit |
| 5,048,755 A | 9/1991 | Dodds |
| 5,074,468 A | 12/1991 | Yamamoto |
| 5,074,999 A | 12/1991 | Drori |
| 5,085,076 A | 2/1992 | Engelmann |
| 5,105,094 A | 4/1992 | Parker |
| 5,105,966 A | 4/1992 | Fort |
| 5,118,072 A | 6/1992 | Sakamoto et al. |
| 5,134,961 A | 8/1992 | Giles |
| 5,139,226 A | 8/1992 | Baldwin et al. |
| 5,144,699 A | 9/1992 | Graham |
| 5,186,433 A | 2/1993 | Pausch |
| 5,192,429 A | 3/1993 | Bader |
| 5,199,462 A | 4/1993 | Baker |
| 5,213,303 A * | 5/1993 | Walker ............... 251/30.02 |
| 5,228,993 A | 7/1993 | Drori |
| 5,248,055 A | 9/1993 | Sanai |
| 5,261,268 A | 11/1993 | Namba |
| 5,269,333 A | 12/1993 | Richmond |
| 5,271,601 A | 12/1993 | Bonzer |
| 5,272,646 A | 12/1993 | Farmer |

(56) References Cited

U.S. PATENT DOCUMENTS

| | | | |
|---|---|---|---|
| 5,277,401 A | 1/1994 | Butler | |
| 5,312,544 A | 5/1994 | Kinney | |
| 5,377,529 A | 1/1995 | Boyd | |
| 5,383,646 A | 1/1995 | Weingarten | |
| 5,389,243 A | 2/1995 | Kaplan | |
| 5,401,396 A | 3/1995 | Lescovich | |
| 5,427,350 A | 6/1995 | Rinkewich | |
| 5,431,181 A | 7/1995 | Saadi | |
| 5,433,380 A | 7/1995 | Hahn | |
| 5,540,107 A | 7/1996 | Silverman | |
| 5,560,820 A | 10/1996 | Consolo | |
| 5,568,825 A | 10/1996 | Faulk | |
| 5,584,314 A | 12/1996 | Bron | |
| 5,632,465 A | 5/1997 | Cordua | |
| 5,645,264 A * | 7/1997 | Kah, Jr. | 251/30.02 |
| 5,655,561 A | 8/1997 | Wendel | |
| 5,670,038 A | 9/1997 | McKinney | |
| 5,704,546 A | 1/1998 | Henderson | |
| 5,709,370 A | 1/1998 | Kah, Jr. | |
| 5,713,729 A | 2/1998 | Hong | |
| 5,730,423 A | 3/1998 | Wu et al. | |
| 5,804,072 A | 9/1998 | Yang | |
| 5,806,558 A | 9/1998 | Greverath | |
| 5,825,094 A | 10/1998 | Hess | |
| 5,830,347 A | 11/1998 | Vollmer | |
| 5,851,004 A | 12/1998 | Wu et al. | |
| 5,853,026 A | 12/1998 | Wlodarczyk | |
| 5,863,443 A | 1/1999 | Mainwaring | |
| 5,865,210 A | 2/1999 | Fort | |
| 5,909,747 A | 6/1999 | Schieber | |
| 5,911,362 A | 6/1999 | Wood | |
| 5,950,667 A | 9/1999 | Nicewonger | |
| 5,956,248 A | 9/1999 | Williams | |
| 5,971,011 A | 10/1999 | Price | |
| 5,971,025 A | 10/1999 | Backlund | |
| 5,979,304 A | 11/1999 | Norais | |
| 5,979,482 A * | 11/1999 | Scott | 137/15.01 |
| 5,979,863 A | 11/1999 | Lousberg | |
| 5,986,573 A | 11/1999 | Franklin | |
| 5,996,608 A | 12/1999 | Hunter | |
| 6,079,437 A | 6/2000 | Beutler | |
| 6,095,484 A | 8/2000 | Frenkel | |
| 6,095,496 A | 8/2000 | Rydin | |
| 6,110,388 A | 8/2000 | Norais | |
| 6,145,810 A | 11/2000 | Connolly | |
| 6,161,100 A | 12/2000 | Saar | |
| D437,917 S | 2/2001 | Weingarten | |
| 6,186,413 B1 | 2/2001 | Lawson | |
| 6,209,576 B1 | 4/2001 | Davis | |
| 6,216,727 B1 | 4/2001 | Genova | |
| 6,216,731 B1 | 4/2001 | Frenkel | |
| 6,220,299 B1 | 4/2001 | Arvidsson | |
| 6,240,336 B1 | 5/2001 | Brundisini | |
| 1,100,095 A1 | 6/2001 | Prescott et al. | |
| 6,254,057 B1 | 7/2001 | Pubben | |
| 6,263,901 B1 | 7/2001 | Lohde | |
| 6,296,227 B1 | 10/2001 | Burcham | |
| 6,323,774 B1 | 11/2001 | Mitchell | |
| 6,377,190 B1 | 4/2002 | Saar | |
| 6,382,585 B1 | 5/2002 | Pubben | |
| 6,394,126 B2 | 5/2002 | Lohde | |
| 6,394,413 B2 | 5/2002 | Lohde | |
| 6,416,038 B1 | 7/2002 | Sindel | |
| 6,535,827 B1 | 3/2003 | Lestina | |
| 6,547,211 B2 * | 4/2003 | Roman | 251/30.01 |
| 6,552,647 B1 | 4/2003 | Thiessen | |
| 6,557,580 B2 | 5/2003 | Lohde | |
| 6,575,307 B2 | 6/2003 | Lockwood | |
| 6,601,604 B1 | 8/2003 | Cooper | |
| 6,616,120 B2 | 9/2003 | Barzuza | |
| 6,666,384 B2 | 12/2003 | Prandi | |
| 6,695,281 B2 | 2/2004 | Williams, Jr. | |
| 6,717,283 B2 | 4/2004 | Skinner | |
| 6,749,136 B1 | 6/2004 | Wilson | |
| 6,766,825 B2 | 7/2004 | Antunez | |
| 6,766,835 B1 | 7/2004 | Fima | |
| 6,792,799 B2 | 9/2004 | Ford | |
| 6,812,848 B2 | 11/2004 | Candela | |
| 6,827,288 B2 | 12/2004 | Noelke | |
| 6,877,714 B2 * | 4/2005 | Hall | 251/45 |
| 6,883,726 B2 | 4/2005 | Polk | |
| 6,916,002 B2 | 7/2005 | Hsi-Chun | |
| 6,929,239 B1 * | 8/2005 | Colin et al. | 251/115 |
| 6,933,624 B2 | 8/2005 | Beaston | |
| 6,957,157 B2 | 10/2005 | Lander | |
| 6,973,827 B2 | 12/2005 | Koike | |
| 6,976,668 B2 | 12/2005 | Weingarten | |
| 6,991,214 B2 | 1/2006 | Richter | |
| 7,000,889 B2 | 2/2006 | Kah, Jr. | |
| 7,007,916 B2 | 3/2006 | Lee | |
| 7,021,750 B2 | 4/2006 | Shibata | |
| 7,028,533 B2 | 4/2006 | Koike | |
| 7,030,767 B2 | 4/2006 | Candela | |
| 7,032,435 B2 | 4/2006 | Hassenflug | |
| 7,043,904 B2 | 5/2006 | Newman | |
| 7,051,576 B2 | 5/2006 | Hutchinson | |
| 7,059,584 B2 | 6/2006 | Balasubramanian | |
| 7,088,239 B2 | 8/2006 | Basinger | |
| 7,100,894 B2 | 9/2006 | Newberg | |
| 7,121,477 B1 | 10/2006 | Noelke | |
| 7,201,187 B2 | 4/2007 | Irwin | |
| 7,218,237 B2 | 5/2007 | Kates | |
| 7,228,726 B2 | 6/2007 | Kates | |
| 7,232,106 B2 | 6/2007 | Kah, Jr. | |
| 7,232,107 B2 | 6/2007 | Kah, Jr. | |
| 7,240,740 B2 | 7/2007 | Reilly | |
| 7,258,532 B2 | 8/2007 | Welch, Jr. | |
| 7,306,008 B2 | 12/2007 | Tornay | |
| 7,311,292 B2 * | 12/2007 | Fedegari | 251/63.5 |
| 7,331,174 B2 | 2/2008 | Welch, Jr. | |
| 7,360,413 B2 | 4/2008 | Jeffries | |
| 7,364,132 B2 | 4/2008 | Browne | |
| 7,383,721 B2 | 6/2008 | Parsons | |
| 7,392,817 B2 | 7/2008 | Burlage | |
| 7,429,803 B2 | 9/2008 | Davis | |
| 7,438,083 B2 | 10/2008 | Feith | |
| 7,451,777 B2 | 11/2008 | Burlage | |
| 7,462,945 B2 | 12/2008 | Baarman | |
| 7,475,863 B2 | 1/2009 | Donovan | |
| 7,501,058 B1 | 3/2009 | Lawrence, Sr. | |
| 7,503,348 B2 | 3/2009 | Irwin | |
| 7,506,899 B2 | 3/2009 | Feith | |
| 7,552,906 B2 | 6/2009 | Irwin | |
| 7,561,057 B2 | 7/2009 | Kates | |
| 7,583,198 B2 | 9/2009 | Kates | |
| 7,596,429 B2 | 9/2009 | Cardinal | |
| 7,596,458 B2 | 9/2009 | Lander | |
| 7,628,910 B2 | 12/2009 | Lockwood | |
| 7,665,713 B1 | 2/2010 | Clark | |
| 7,668,670 B2 | 2/2010 | Lander | |
| 7,694,934 B2 | 4/2010 | Irwin | |
| 7,708,206 B2 | 5/2010 | Ivans | |
| 7,735,513 B2 | 6/2010 | Bush | |
| 7,779,852 B2 | 8/2010 | Burlage | |
| 7,806,382 B1 | 10/2010 | Palumbo | |
| 7,819,020 B2 | 10/2010 | Jacobi | |
| 7,852,487 B2 | 12/2010 | Rembe | |
| 7,895,993 B2 | 3/2011 | Weisz | |
| 7,900,647 B2 | 3/2011 | Tornay | |
| 7,930,069 B2 | 4/2011 | Savelle | |
| 7,944,363 B2 | 5/2011 | Kim | |
| 7,981,386 B2 | 7/2011 | McAvoy | |
| 8,235,352 B2 | 8/2012 | Irwin | |
| 8,360,250 B2 | 1/2013 | Nguyen | |
| 8,505,566 B2 | 8/2013 | Nguyen | |
| 2002/0002425 A1 | 1/2002 | Dossey | |
| 2002/0056826 A1 | 5/2002 | Tripoli | |
| 2002/0145123 A1 | 10/2002 | Kah | |
| 2003/0051759 A1 | 3/2003 | Schmidt | |
| 2003/0197617 A1 | 10/2003 | Berger | |
| 2004/0073524 A1 | 4/2004 | Smith | |
| 2004/0217189 A1 | 11/2004 | Regli | |
| 2005/0150560 A1 | 7/2005 | Amato | |
| 2005/0195078 A1 | 9/2005 | Basinger | |

(56) References Cited

U.S. PATENT DOCUMENTS

| | | |
|---|---|---|
| 2005/0199842 A1 | 9/2005 | Parsons |
| 2005/0224118 A1 | 10/2005 | Tornay |
| 2005/0224744 A1* | 10/2005 | Newberg .................. 251/331 |
| 2005/0235306 A1 | 10/2005 | Fima |
| 2005/0279169 A1 | 12/2005 | Lander |
| 2006/0005620 A1 | 1/2006 | Koike |
| 2006/0076527 A1 | 4/2006 | Bush |
| 2006/0157580 A1 | 7/2006 | Regli |
| 2006/0202051 A1 | 9/2006 | Parsons |
| 2006/0267758 A1 | 11/2006 | Barth |
| 2007/0028966 A1 | 2/2007 | Feith |
| 2007/0119974 A1 | 5/2007 | Johnson |
| 2007/0194150 A1 | 8/2007 | Ericksen |
| 2007/0262168 A1 | 11/2007 | Ericksen |
| 2008/0029722 A1 | 2/2008 | Irwin |
| 2008/0061558 A1 | 3/2008 | Baarman |
| 2008/0136630 A1 | 6/2008 | Leggett |
| 2008/0143109 A1 | 6/2008 | Pitchford |
| 2008/0266125 A1 | 10/2008 | Windisch |
| 2008/0284174 A1 | 11/2008 | Nagler |
| 2008/0285049 A1 | 11/2008 | Rembe |
| 2008/0289693 A1* | 11/2008 | Irwin et al. .................. 137/12 |
| 2008/0314463 A1 | 12/2008 | Weingarten |
| 2009/0001193 A1 | 1/2009 | Parsons |
| 2009/0085756 A1 | 4/2009 | Atassi |
| 2009/0091461 A1 | 4/2009 | Kim |
| 2009/0095935 A1* | 4/2009 | Wlodarczyk .................. 251/331 |
| 2009/0101855 A1 | 4/2009 | Nguyen |
| 2009/0179165 A1 | 7/2009 | Parsons |
| 2009/0207031 A1 | 8/2009 | Barth |
| 2009/0212248 A1 | 8/2009 | Kozak |
| 2009/0290951 A1 | 11/2009 | Blom |
| 2009/0301173 A1 | 12/2009 | Lamberti |
| 2009/0308460 A1 | 12/2009 | Tschurtz |
| 2010/0001223 A1 | 1/2010 | Tschurtz |
| 2010/0045471 A1 | 2/2010 | Meyers |
| 2010/0071776 A1 | 3/2010 | Ringer |
| 2010/0078584 A1 | 4/2010 | VanDenBijgaart |
| 2010/0132803 A1 | 6/2010 | Fima |
| 2010/0140524 A1 | 6/2010 | Hays |
| 2010/0218829 A1 | 9/2010 | Bush |
| 2010/0218833 A1 | 9/2010 | Bush |
| 2010/0222930 A1 | 9/2010 | Bush |
| 2010/0258204 A1 | 10/2010 | Cipolla |
| 2010/0270803 A1 | 10/2010 | Irwin |
| 2010/0289652 A1 | 11/2010 | Javey |
| 2010/0294971 A1 | 11/2010 | Hajjar |
| 2011/0024665 A1 | 2/2011 | Hajjar |
| 2011/0042598 A1 | 2/2011 | Kozak |
| 2011/0073188 A1 | 3/2011 | Marcus |
| 2011/0073788 A1 | 3/2011 | Marcus |
| 2011/0114195 A1 | 5/2011 | Haas |
| 2011/0114868 A1 | 5/2011 | Warren |
| 2011/0168929 A1 | 7/2011 | Buestgens |
| 2011/0180464 A1 | 7/2011 | Schmitt |
| 2011/0279576 A1 | 11/2011 | Borra et al. |
| 2011/0279577 A1 | 11/2011 | Borra et al. |
| 2011/0279579 A1 | 11/2011 | Borra et al. |
| 2012/0211691 A1* | 8/2012 | Karl et al. .................. 251/333 |
| 2013/0008542 A1 | 1/2013 | Irwin |

FOREIGN PATENT DOCUMENTS

| | | |
|---|---|---|
| GB | 698849 | 10/1953 |
| JP | 2000256493 | 9/2000 |
| WO | 03038321 | 5/2003 |

OTHER PUBLICATIONS

Korean Intellectual Property Office, International Search Report issued in International Patent Application No. PCT/US2012/045569, Dec. 6, 2012, 1 p.

Rain Bird Corporation, Agriculture Irrigation Equipment 1981 Catalog, pp. 46-49, 1979, 6 pp.

Rain Bird Corporation, Do-It-Yourself Watering Systems Catalog, pp. 14-15, 1993, 4 pp.

Rain Bird Corporation, Landscape Irrigation Products 1993-1994 Catalog, pp. 61-78; 109-111, 1993, 23 pp.

Rain Bird Corporation, Landscape Irrigation Products 2001-2002 Catalog, pp. 102-128; 166; 191-198; 208-209, Mar. 2001, 41 pp.

Rain Bird Corporation, Landscape Irrigation Products 2005-2006 Catalog, pp. 126-166; 219; 229-232; 256-272, Jun. 2004, 66 pp.

Rain Bird Corporation, Landscape Irrigation Products 2006-2007 Catalog, pp. 121-156; 204; 221-224; 246; 248-264, Jul. 2005, 61 pp.

Rain Bird Corporation, Nursery Equipment 1986/1987 Catalog, pp. 27-29, 1986, 5 pp.

Rain Bird Corporation, Turf Irrigation Equipment 1982 Catalog, pp. 45-54; 64-68, 1982, 17 pp.

Rain Bird Corporation, Turf Irrigation Equipment 1983 Catalog, pp. 43-50; 60-63, 1983, 14 pp.

Rain Bird Corporation, Turf Irrigation Equipment 1985 Catalog, pp. 40-50; 61-66, 1984, 19 pp.

Rain Bird Corporation, Turf Irrigation Equipment 1987 Catalog, pp. 45-60; 77-84, 1987, 26 pp.

* cited by examiner

ECCENTRIC DIAPHRAGM VALVE

CROSS-REFERENCE TO RELATED APPLICATION

This application claims the benefit of U.S. Provisional Patent Application No. 61/504,623, filed Jul. 5, 2011, and incorporated herein for all purposes.

FIELD

This disclosure is directed to a diaphragm valve for irrigation systems and, in particular, to a diaphragm valve configured for improved flow and reduced wear.

BACKGROUND

Diaphragm valves for use in irrigation systems commonly have an inlet passage, an outlet passage, and a diaphragm positioned to selectively open and close a generally cylindrical diaphragm seat to permit or block fluid flow from the inlet passage to the outlet passage. A control chamber is positioned on the opposite side of the diaphragm from the seat to control the position of the diaphragm relative to the seat.

When the fluid pressure acting on the diaphragm from the control chamber side exceeds the fluid pressure acting on the opposite side of the diaphragm, the diaphragm will be forced against the seat to block fluid flow through the seat and thereby block fluid flow from the inlet passage to the outlet passage.

Conversely, when the fluid pressure acting on the diaphragm from the control chamber side is less than the fluid pressure acting on the opposite side of the diaphragm, the diaphragm will be forced away from the seat to permit fluid flow through the seat and thereby permit fluid flow from the inlet passage opening to the outlet passage.

As the diaphragm moves from the open position to the closed position, the distance, and in turn the flow area, between the seat and the diaphragm continually decreases until the diaphragm engages the seat to block flow through the seat. The bottom surface of the diaphragm commonly has an annular portion designed to engage an annular seat. In the closing operation, the diaphragm typically lowers straight onto the seat so that the entire annular portion engages the seat relatively simultaneously. The final portion of the closing movement causes an abrupt change in the flow area between the diaphragm and the seat and, consequently a sudden pressure spike greater than the upstream pressure. More specifically, the abrupt conversion of the motion energy in the flowing fluid to pressure energy acting on the components of the diaphragm valve can cause a pressure spike in the upstream pressure. Pressure spikes are known to cause the diaphragm valve to experience a water hammer effect, which can undesirably result in increased stress on the components of the diaphragm valve, as well as other components of the irrigation system. Overall, this can lead to premature wear or failure of the components.

In order to control the pressure in the control chamber, the valve typically has a fluid entrance path to, and a fluid exit path from, the control chamber. The fluid entrance path may extend between the inlet passage and the control chamber and may be continuously supplied with fluid from the inlet passage. The fluid exit path may extend between the control chamber and the outlet passage. A selectively actuable control valve or actuator may be positioned to block and permit fluid flow through the fluid exit path.

When the control valve is positioned to block fluid flow through the fluid exit path from the control chamber, the fluid entrance path continues to permit fluid to flow from the inlet passage to the control chamber, thereby causing fluid to accumulate in the control chamber. The diaphragm has a larger surface area exposed to pressure on the control chamber side than is exposed to high pressure on the side facing the inlet passage. Thus, when the fluid pressure in the control chamber and inlet passage are generally the same, the operation of the fluid pressure in the control chamber acts on the greater surface area of the control chamber side of the diaphragm and causes the diaphragm to either shift from the open position to the closed position or remain in the closed position.

When the control valve is positioned to permit fluid flow through the fluid exit path from the control chamber, fluid exits the control chamber at a faster rate than fluid enters the control chamber. This causes the fluid pressure acting on the control chamber side of the diaphragm to decrease relative to the fluid pressure acting on the side of the diaphragm facing the inlet passage. The fluid pressure in the inlet passage then causes the diaphragm to move to the open position, whereby the diaphragm is spaced from the seat and fluid flow is permitted from the inlet passage, through the seat and out the outlet passage.

The flow path that the fluid follows when the diaphragm valve is in the open position is generally from the inlet passage, through the diaphragm seat, and finally out through the outlet passage. As the fluid follows this path, internal geometry of the diaphragm valve and valve housing can cause very rapid acceleration and deceleration of the fluid. Specifically, in reverse flow, upright diaphragm valves, a cylindrical wall forms an annular diaphragm seat and a passage from the inlet leads to an annular cavity between the cylindrical wall and the outer wall of the valve. The entrance to the annular cavity typically has a reduced flow area between the end of a wide inlet passage and the cylindrical wall which can cause acceleration of the fluid upon entering a smaller area from the larger inlet passage. Simultaneously, this intersection forces some of the incoming flow to turn upward to the valve seat and directs some of the incoming flow to the lateral sides and to the downstream side of the annular cavity before flowing upward to the seat. Such geometry of upright valves and internal flow path therein can lead to rapid turning of the fluid flow, thereby accelerating the flow, in a vector sense (or in other words negative acceleration or deceleration), by forcing it to change direction several times.

This undesirable acceleration and deceleration may be compounded during the transition periods between the open and closed positions depending on the way the diaphragm shifts relative to the seat. Particularly, for diaphragms that lift straight off of the seat, or in other words generally vertical, the seat draws a significant amount of water from the outlet side of the seat thereby maintaining a relatively high acceleration of the flow at least during the transition between the open and closed positions of the valve.

Further, while these known diaphragms are designed to lift straight upward, the varying forces and pressures on the diaphragm can cause the diaphragm to slightly tilt as it lifts upward affecting pressure loss in undesirable ways. In one case, since the downstream side of the annular cavity creates a dead end where the fluid is redirected back toward the valve seat, this structure causes stagnation and relatively high fluid pressure at the downstream side of the annular cavity. The high pressure may result in the diaphragm lifting with an undesirable tilt where the downstream side of the diaphragm lifts higher than the upstream side. Such tilting in undesirable directions can cause turbulence and pressure loss.

In addition, the geometry of the diaphragm seat itself can cause additional acceleration of the fluid as it approaches the opening of the seat from the entrance area of the inlet cavity. This can be due to the larger flow area of the inlet opening or the inlet cavity as compared to the flow area of the opening of the seat, which can cause the fluid to rapidly accelerate as it approaches the opening in order to maintain conservation of mass in the incompressible flow. Moreover, the geometry of the seat can cause deceleration of the fluid at it exits the opening of the seat and enters the outlet opening due to the smaller flow area of the opening of the seat as compared to the larger flow area of the adjacent portion of the outlet opening.

Such varying flow, with rapid acceleration and/or deceleration of the flow, whether through a change in flow area or flow direction, can cause the loss of energy in the fluid, which results in a pressure loss in the diaphragm valve and can therefore increase the number of valves required to irrigate the intended area.

In view of the foregoing, there remains a need for diaphragm valves having improved flow, including the reduction of energy lost during flow.

DESCRIPTION OF PREFERRED EMBODIMENTS

Referring to FIGS. 1-6, an eccentric diaphragm valve 10 includes a valve body 14 and a bonnet or cover 16 attached to the valve body 14. A solenoid actuator 18 is attached to the bonnet 16. The diaphragm valve 10 includes an offset or eccentric diaphragm 20 located between the valve body 14 and the bonnet 16 and that is shiftable both away from and toward a diaphragm valve seat 22 formed by the valve body 14. In the illustrated form, the valve seat 22 is placed farther away from an inlet passage 26 compared to known valves to provide more space between the two for incoming fluid flow. This larger space is referred to herein as an inlet entrance area 42. Due to its increased size, the inlet entrance area 42 reduces the change in flow area relative to the flow area of the larger inlet passage 26. This configuration also permits relatively wider turns for the fluid. These features result in a more uniform fluid flow and, therefore, less acceleration and deceleration.

In one form, placing an eccentric diaphragm 20 on such an eccentric valve seat results in the diaphragm 20 pivoting in a hinge-like manner where the inlet side 21 of the diaphragm 20 raises higher than the outlet side 23 of the diaphragm 20 to a slanted orientation (FIG. 6), as explained below. At least during a transition period while the diaphragm 20 moves between the open and closed positions, this results in more direct flow on the inlet side 60 of the valve seat 22 than on the outlet side 58 of the valve seat, which reduces pressure loss and the fluctuation of flow velocity. The risk of water hammer also is reduced because closing the valve 10 is performed by rotating the diaphragm 20 from its slanted orientation back onto the horizontal valve seat 22 which causes the diaphragm 20 to engage the valve seat 22 in a relatively gradual or rolling manner from one side of the valve seat 22 to the other to avoid an abrupt change of pressure.

In more detail, when the diaphragm 20 is engaged with the valve seat 22, fluid flow through the diaphragm valve 10 is blocked. Conversely, when the diaphragm 20 is unengaged with the diaphragm valve seat 22, fluid flow through the diaphragm valve 10 is permitted. In conjunction with the solenoid actuator 18, an internal control chamber 24, positioned between the valve body 14 and the diaphragm 20 on one side and the bonnet 16 on the other, is used to shift the diaphragm 20 relative to the valve seat 22.

Figure 3:
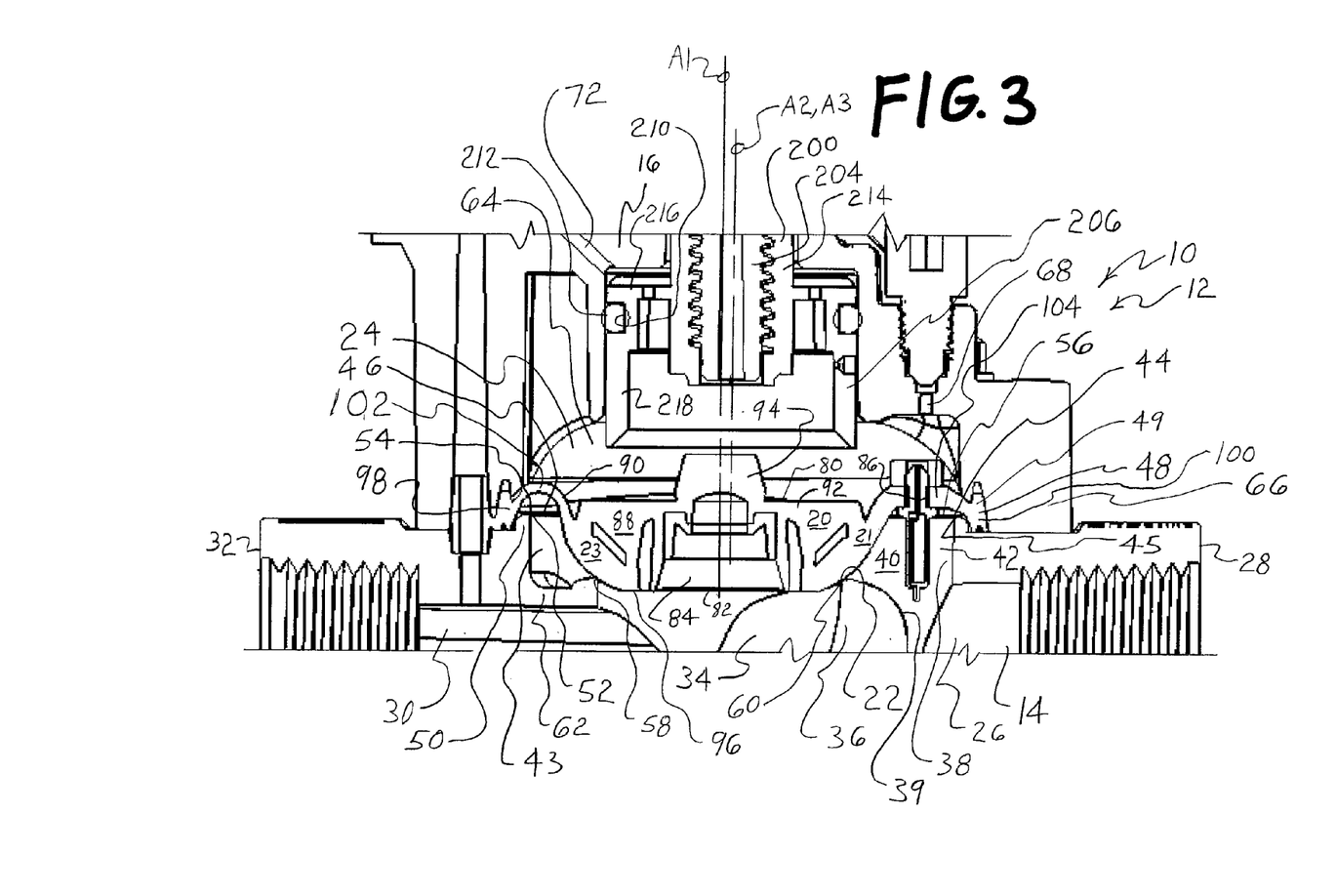
FIG. 3 is a close-up view of a portion of the cross-sectional view of FIG. 2.
Figure 4:
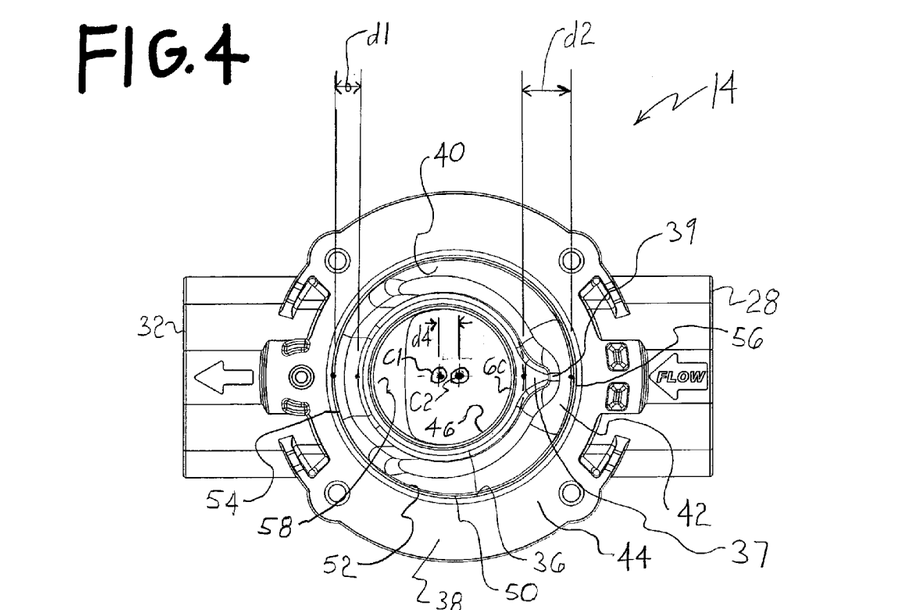
FIG. 4 is a top plan view of a valve body component of the diaphragm valve of FIG. 1.

The valve body 14 defines the inlet passage 26 that terminates at an inlet opening 28 and an outlet passage 30 that terminates at an outlet opening 32. The inlet and outlet openings 28, 32 are sized and shaped (here shown to be threaded as an example) to be joined to piping of an irrigation system. In one form, the outlet passage 30 extends at least generally linearly as it extends interiorly from the outlet end 32 until the outlet passage 30 forms an upwardly turned portion 34. The upwardly turned portion 34 is formed by a generally annular or cylindrical wall 36 of the valve body 14. The annular wall 36 terminates at the valve seat 22 to form the entrance to the outlet passage 30. While the valve seat 22 may be any closed shape, in one particular form the valve seat 22 is at least substantially circular. With this arrangement, the valve seat 22 extends at least substantially horizontal and around a vertical axis A1 (FIG. 3). The valve seat 22 also defines a center point C1 at the vertical axis A1 in top view (FIG. 4). In this form, the valve seat 22 extends substantially normal to the vertical axis A1. It will be understood, however, that the valve seat 22 is not meant to be limited to only a perfectly circular form, and the axis and center point are not necessarily limited to axes or centers of a circular shape as long as the axis and center point define some central point defined by the closed shape of the valve seat. This similarly applies to any of the axes and center points of the structures described herein.

It will also be understood that the mention of horizontal and vertical directions or axes is meant to include any rotated orientation of the valve body by any degree as long as the valve seat extends at least substantially parallel to the general direction of flow through the valve. In the illustrated form, the valve seat extends at least substantially horizontal as is the general direction of flow F (FIG. 2) through the valve 10 from inlet end 28 to outlet end 32.

The valve body 14 also includes an at least partially annular, outer wall 38, and an at least partially annular inlet chamber or cavity 40 that extends between the annular wall 36 and the valve seat 22 on the inside and the annular wall 38 on the outside. The inlet chamber 40 extends at least partially, but in one form entirely, about the valve seat 22, and receives water flow from the inlet passage 26 at an inlet side (also referred to as the inlet entrance area) 42 of the inlet chamber 40. The annular wall 36 also forms a flaring guiding fin or projection 37 at the inlet side 42 of the inlet chamber 40 and with an edge 39 (FIGS. 3-4) facing the inlet end 28 to more smoothly redirect the incoming fluid to the lateral sides of the annular wall 36.

The outer wall 38 forms an upper rim 44 that defines the main upper opening 46 on the valve body 14 and forms a periphery 45 of the inlet chamber 40. The upper rim 44 provides access to the valve seat 22 for the diaphragm 20 and is adapted to receive at least a portion of an outer perimeter 48 of the diaphragm 20 to secure the outer perimeter 48 between the valve body 14 and the bonnet 16. The outer perimeter 48 may have at least one circumferential bead 49 retained within grooves on the valve body 14, bonnet 16, or both. The upper rim 44 may also provide bolting locations to secure the bonnet 16 to the valve body 14. A raised lip 50 of the upper rim 44 forms the inner edge 52 of the upper rim 44 defining the main opening 46.

The upper rim 44 and the inlet chamber 40 extend around a vertical axis A2 and define a common center point C2 in top view and at the vertical axis A2. In one form, the upper rim 44 is at least substantially circular and is non-concentric to the valve seat 22. Thus, the vertical axis A1 is offset in the downstream direction from the vertical axis A2 (FIG. 3), and the center point C1 is offset the same from the center point C2 (FIG. 4) in order to align with the eccentric diaphragm 20 as explained below. In other words, the vertical axis A1 of the valve seat 22 is closer to the outlet end 32 than the vertical axis A2 of the inlet chamber 40 and the upper rim 44. With this configuration, an outlet side 54 of the upper rim 44 is closer to the valve seat 22 than an inlet side 56 of the upper rim. Thus, the outlet side 54 of the upper rim 44 is spaced from the outlet side 58 of the valve seat 22 by a distance d1 which is shorter than a distance d2 between the inlet side 56 of the upper rim 44 and the inlet side 60 of the valve seat 22 (best seen in FIG. 4). More precisely, distances d1 and d2 are measured to the outer diameter of the valve seat 22 and, in one form, as provided by the cylindrical wall 36. For distance d2 at the very inlet end of valve seat 22, the distance d2 starts at the point the cylindrical wall 36 would be if it were substantially cylindrical (as shown by the dashed line) instead of forming the fin 37. This results in the inlet chamber 40 being narrower closer to the outlet end 32 than its inlet side (or inlet entrance area) 42 near the inlet end 28. This larger area for the inlet entrance area 42 contributes to a smoother and more uniform flow through the valve. The inlet chamber 40 also is shallower on the outlet side 54 to accommodate a wall 62 of the valve body 14 that defines in part the outlet passage 30. In other words, the outer side of the wall 62 also defines the bottom of the inlet chamber 40 at the outlet side 54.

The bonnet 16 has a generally dome-shaped portion 64 surrounded by a peripheral flange 66 that is secured to the upper rim 16. The dome shaped portion 64 forms the top of the control chamber 24 and a bleed port 68 to selectively release pressure and/or fluid from the control chamber 24. The dome shaped portion 64 also holds a flow-control assembly 200 described below. In one optional form, a spring 70 (FIG. 3) may be placed within bonnet 16 and between the flow control assembly 200 if present and the diaphragm 20 to assist with biasing the diaphragm 20 toward the valve seat 22.

A bypass passage 72 is formed on the bonnet 16 for directing the fluid from the control chamber 24 to the outlet passage 30. To control the flow through the bypass passage 72, the solenoid actuator 18 is mounted on the bonnet 16 and provides a solenoid valve seat 74 that forms part of the bypass passage and which is opened and closed by a plunger 76. The plunger 76 moves axially to engage and disengage the solenoid valve seat 74. More specifically, a spring 75 biases the plunger 76 to engage the valve seat 74 to block flow from the control chamber 24 to the outlet passage 30. When the solenoid actuator 18 is energized, a coil produces a magnetic flux that retracts the plunger 76 away from the solenoid valve seat 74 to open the bypass passage 72 and allow fluid from the control chamber 24 to the outlet passage 30. When electrical current to the solenoid activator 18 is turned off, the spring 75 biases the plunger 76 to engage the solenoid valve seat 74 and close the bypass passage 72 to cause fluid pressure to build in the control chamber 24.

Figure 1:
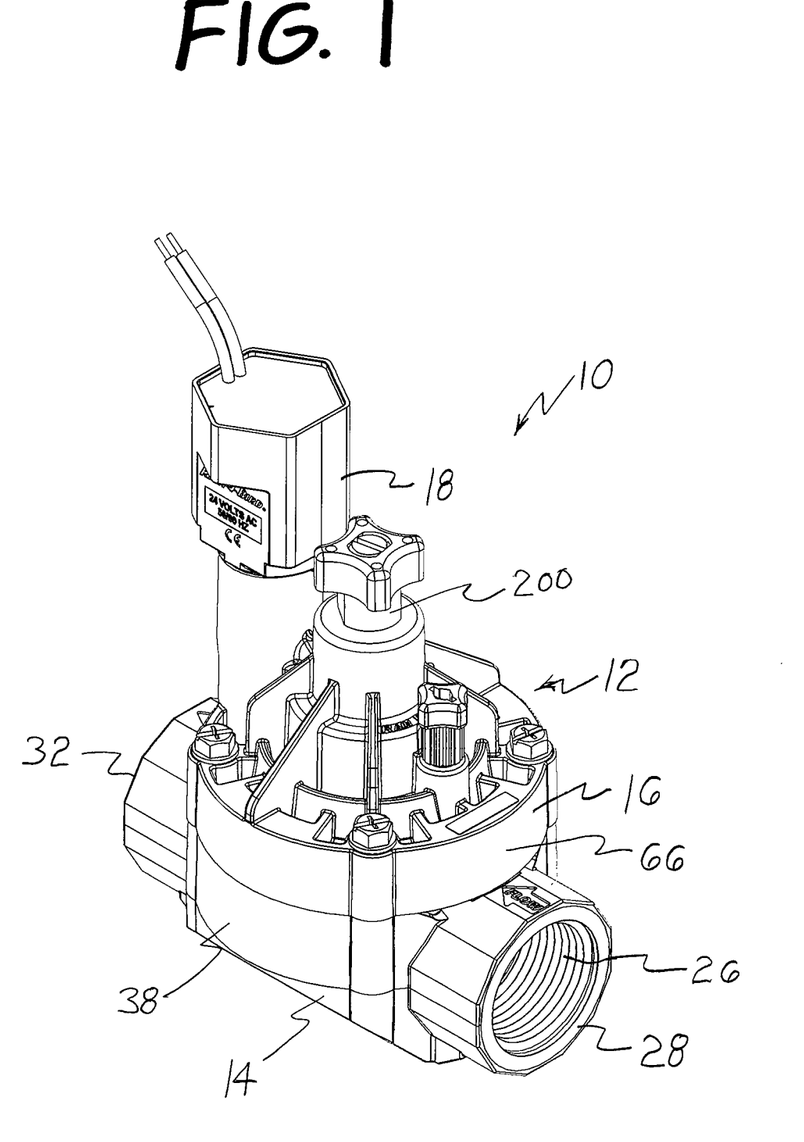
FIG. 1 is a perspective view of a diaphragm valve for irrigation systems.
Figure 2:
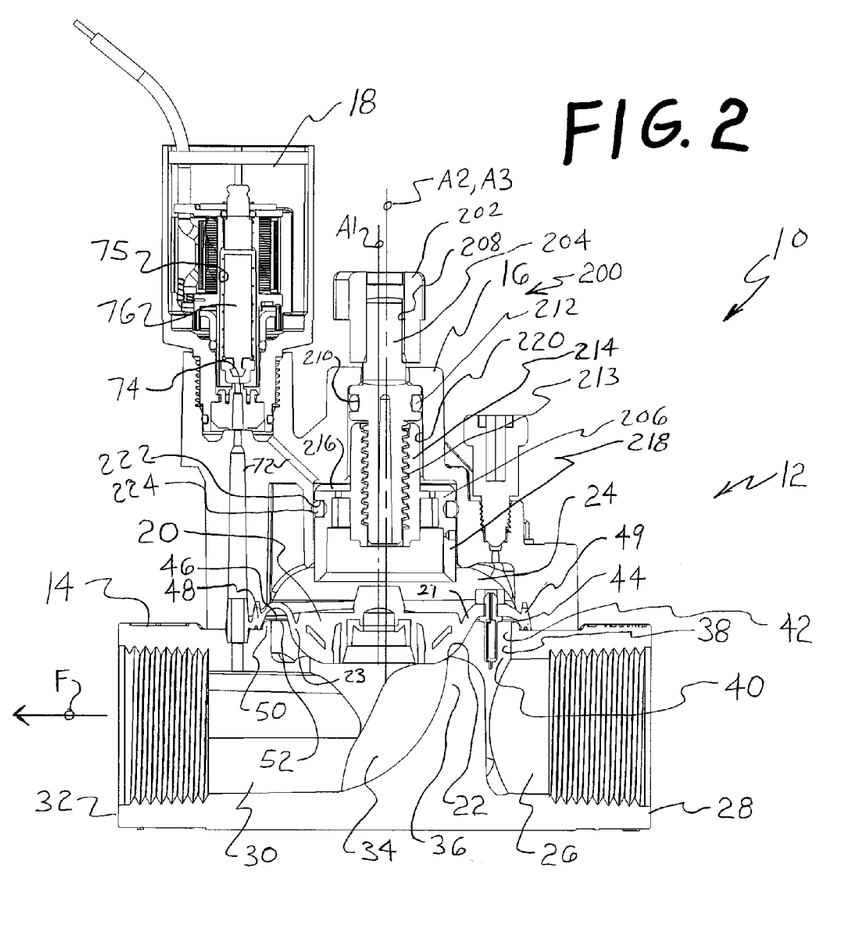
FIG. 2 is a side cross-sectional view of the diaphragm valve of FIG. 1 shown in a closed state.

Referring to FIGS. 2-3, a lower side 82 of the diaphragm 20 faces the valve seat 22 while an upper side 80 faces the bonnet 16 and flow-control assembly 200. The upper side 80 forms the bottom surface of the control chamber 24. An insert 84 also may be embedded within the diaphragm 20 to stiffen the diaphragm when desired. A filtered through-hole 86 on the diaphragm 20 enables flow from the inlet passage 30 to the control chamber 34.

The diaphragm 20 has a generally off-centered thickened portion 88 within the outer perimeter 48 and that extends both above and below a connection with a thin web 90 that extends between the thickened portion 88 and the outer perimeter 48 of the diagram 20. The web 90 has an outlet side 102 located by the outlet side 54 of the upper rim 44 and an inlet side 56 of the upper rim 44. On the upper side 82 of the diaphragm 20, the thickened portion 88 extends upward to form a generally flat, disc-shaped portion 92 of the diaphragm 20. A peg 94 extends upward from the center of the disc-shaped portion 92, and although all forms do not need the spring 70, the peg 94 may be used to anchor the spring 70 if desired. On the lower side 80 of the diaphragm 20, the thickened portion 88 has a convex outer bottom surface 96 for engaging the valve seat 22. In one form, the convex profile of the bottom surface 96 is generally bowl shaped. Both the thickened portion 88 and the outer perimeter 48 are circular, but may be other shapes as mentioned above.

Figure 5:
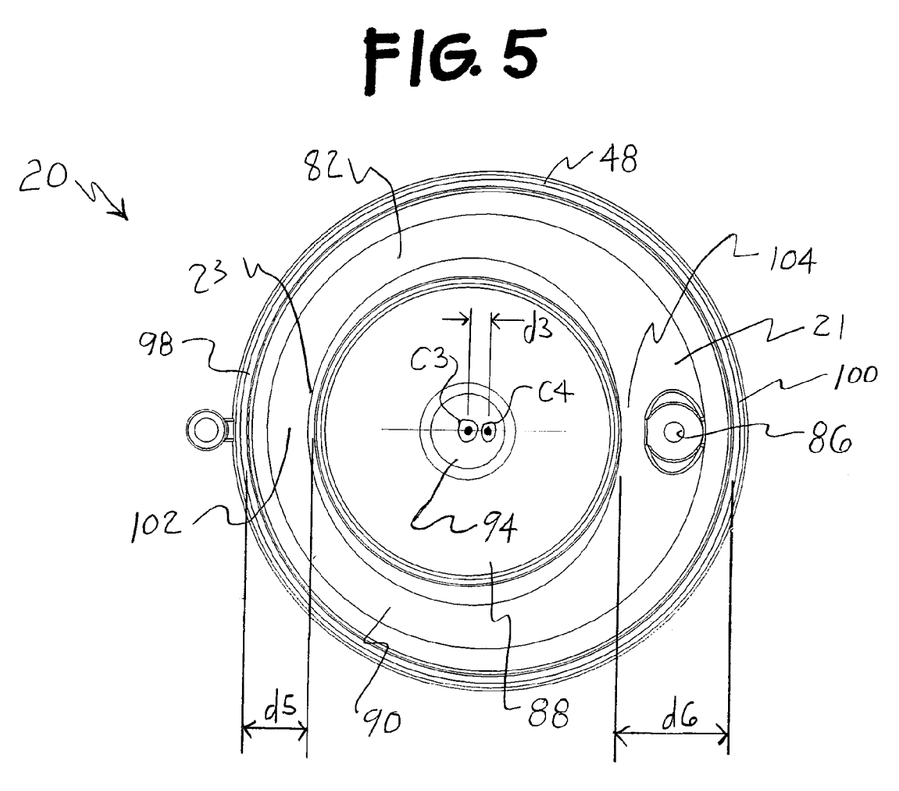
FIG. 5 is a top plan view of a diaphragm of the diaphragm valve of FIG. 1.

As illustrated in FIG. 5, the thickened portion 88 defines a center point C3 and the outer perimeter 48 defines a center point C4. The thickened portion 88 is centered on the valve seat 22 so that the center point C3 of the thickened portion and the center point C1 of the valve seat 22 are at least substantially on the same vertical axis A1. Thus, the thickened portion 88 also is substantially concentric to the valve seat 22. Since the outer perimeter 48 of the diaphragm 20 aligns with the upper rim 44 of the valve body 14, the center point C4 of the outer perimeter 48 of the diaphragm 20 and the center point C2 of the inlet chamber 40 are on the same vertical axis A2 and, thus, are also concentric to one another.

Since the thickened portion 88 aligns with the valve seat 22, and the outer perimeter 48 aligns with the upper rim 22 and inlet chamber 40, the diaphragm 20 has the same, or nearly the same, offset distance to that of the valve body 14. Thus, the center points C3 and C4 of the diaphragm are offset a distance d3 (FIG. 5) which is the same as the offset distance d4 between center points C1 and C2 (or axes A1 and A2) (FIG. 4).

In one form, the offset distances d3 and d4 are approximately 0.05 to 0.15 inches (1.3 to 3.8 mm), and in another form approximately 0.1 inches (2.5 mm) for a one-inch valve (i.e., a valve that attaches to one inch pipes). In another form, the offset d3 or d4 is a percentage of the valve or pipe size such as about 5-15%, and in one form, about 10% of the valve size. The difference between d1 and d2 is the same length as the offset.

Since the thickened portion 88 is placed concentrically on the valve seat 22, the center point C3 of the thickened portion 88 is closer to the outlet end 32 than the center point C4 of the outer perimeter 48. This in turn places the thickened portion 88 closer to the outlet end 32 than the inlet end 28. The outer perimeter 48 has an outlet side 98 and an opposite inlet side 100 near the inlet side 60 of the valve seat 22 and the inlet entrance area 42. Thus, the thickened portion 88 is closer to the outlet side 98 of the outer perimeter 48 than the inlet side 100 of the outer perimeter 48.

To facilitate the hinging and stretching of the diaphragm 20, the diaphragm may be made of nitrile rubber, Ethylene Propylene Diene Monomer (EPDM) rubber, or any other elastic material sufficient to provide the characteristics of the diaphragm described herein. In one form, the diaphragm 20 provides a bias to its configuration in the closed state engaging the valve seat 22.

Figure 6:
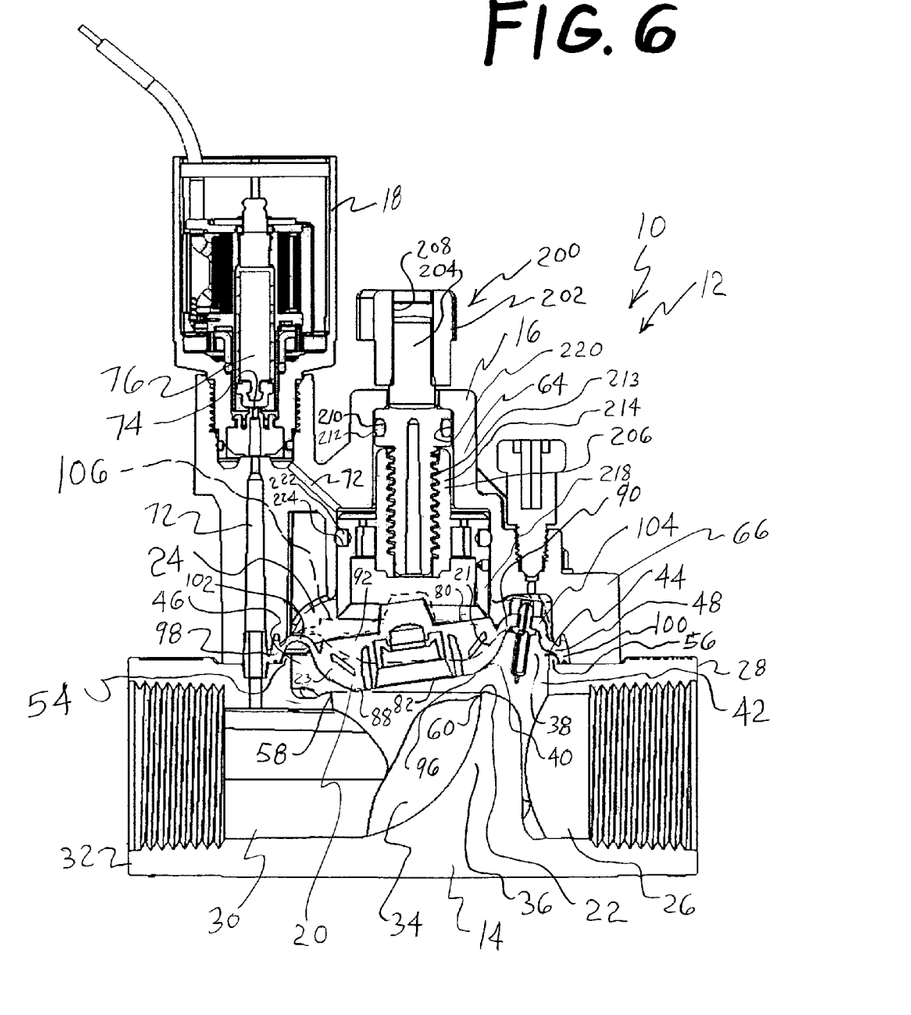
FIG. 6 is a side cross-sectional view of the diaphragm valve of FIG. 1 shown in an open state.

With this configuration, the outlet side 102 of the web 90 has a smaller radial width (d5 in FIG. 5) than the radial width (d6) of the inlet side 104 of the web 90 where in one form, distances d5 and d6 correspond respectively to distances d1 and d2. Thus, the difference between d5 and d6 is the same length as d3. During the opening of the valve 10, as the diaphragm 20 lifts off of the valve seat 22 under fluid pressure and against the bias of the diaphragm 20 (and the spring 70 if present), the longer inlet side 104 shifts vertically higher than the outlet side 102, which results in a hinging action at the outlet side 102 so that the diaphragm 20 pivots to a slanted orientation (FIG. 6). This configuration also provides a larger surface area on the web 90 near the inlet side 42 of the inlet chamber 40 than by the opposite outlet side 58 of the valve seat 22, initially resulting in more fluid pressure from incoming flow on the inlet side 104 versus that on the outlet side 102. With the hinging action and added pressure on the inlet side 104, the diaphragm 20 initially lifts vertically off of the valve seat 22 higher at the inlet side 60 of the valve seat 22 than at the outlet side 58 of the valve seat 22. In order to limit over rotation of the diaphragm 20, the inlet side 102 of the web 90 is thicker than the web's outlet side 104 to slightly stiffen the inlet side 102. Over rotation can place the relatively thinner web outlet side 104 too close to the valve seat 22 where it may impact fluid pressure sufficiently high to damage the thinner area 102 of the web 90. The structure described above results in more direct and smoother flow through the valve while the diaphragm 20 moves to a fully open position as well as a gradual pressure change when the diaphragm 20 closes the valve seat 22.

In operation, in a closed condition of the valve 10, the solenoid actuator 18 will close the bypass passage 72, and the control chamber 24, as well as the annular inlet chamber 40, will fill with fluid. Since the diaphragm 20 has a greater surface area in the control chamber 24 on its upper side 80 compared to the annular surface area on the lower side 82 of the diaphragm over the inlet chamber 40, the higher forces from the fluid in the control chamber 24 combined with the biases of the diaphragm 20 and spring 70 if present holds the diaphragm 20 against the valve seat 22. The diaphragm 20 will remain at its closed position and engaged with the valve seat 22 as long as the fluid in the control chamber 24 provides at least about 60% of the supply pressure (referred to as the cracking pressure where the total forces on the two sides of the diaphragm are at an equilibrium).

Once an electrical signal is sent to the solenoid actuator 18 to open the bypass passage 72, fluid flow is permitted between the control chamber 24 and the outlet passage 30. The release of pressure in the control chamber 24 will cause the fluid in the inlet chamber 40 to force the diaphragm 20 to rise off of the valve seat 22 and against the bias of the diaphragm, and the spring if present, as described above, by initially pivoting the diaphragm 20 to a tilted orientation (FIG. 6) during the transition period so that the valve seat 22 is open wider at the inlet side 60 of the valve seat 22 versus the outlet side 58 of the valve seat 22. This positions more of the incoming flow on the inlet side 42 versus on the outlet side 43 of the inlet chamber 40 to provide a relatively more direct flow to the inlet side 60 of the valve seat 22 while the diaphragm 20 is moving upward. Hinging the diaphragm 20 near the outlet sides 43, 58 to open the diaphragm 20 wider at the inlet sides 42, 60 allows the diaphragm to guide more of the flow over the inlet side 60 of the valve seat 22 for smoother flow through the valve.

By offsetting the valve seat 22 toward the outlet end 32, the inlet chamber 40 has more space on its inlet side 42 to receive more of the incoming flow within the inlet chamber 40. In the illustrated example, for an offset d4 of 0.1 inches for a one-inch valve, radial width d2 at the inlet entrance area 42 is increased from 0.29 inches (on concentric valves) to 0.39 inches (for eccentric valve 10). This is an approximately 35% increase in length. In one form, the radial width d2 may be increased from about 17% to about 50%. As mentioned above, the larger inlet entrance area 42 provides smoother flow due in part to less of a bottleneck and enables relatively wider turns, which reduces pressure loss due to friction and energy loss from relatively sharper turns in the fluid flow. These features combine to reduce the pressure loss over valves using concentrically located valve seats.

From the slanted orientation, the diaphragm 20 will stretch and continue to shift upward until the diaphragm 20 levels out to a generally horizontal position 106 (shown in dashed line on FIG. 6) or other position where the diaphragm presses upward against the flow-control assembly 200, if present, or the upper surface of the control chamber 24. The open valve 10 will eventually stabilize at a certain flow rate with the diaphragm 20 in a fully opened position, such as the level orientation illustrated in FIG. 6.

Once the solenoid actuator 18 is deactivated to close the bypass passage 72, high-pressure fluid upstream of the diaphragm 20 still feeds high pressure fluid into the control chamber 24 through the filtered through-hole 86. Because there is nowhere for the high-pressure fluid to go, pressure in the control chamber 24 rises to nearly the high incoming line pressure until the diaphragm 20 is forced back toward the valve seat 22. The diaphragm 20 closes with the reverse process as described for opening the valve. Thus, the diaphragm 20 first reverts back to the slanted orientation. Then, the diaphragm 20 closes with the same pivoting action as when the diaphragm 20 opened except in reverse due to the smaller web at the outlet side 102 as opposed to the inlet side 104. This pivoting action will cause the diaphragm 20, and specifically the thickened portion 88, to first engage the outlet side 58 of the valve seat 22 and pivot down along the valve seat 22 toward the inlet end 28 until the diaphragm 20 engages the inlet side 60 of the valve seat 22 to completely close the valve seat 22. This relatively gradual manner of closing the valve seat 22 limits the risk of water hammer. It will be understood that gradual here refers to engagement between different parts of the bottom surface 82 of the diaphragm 20 and the valve seat 22 occurring intentionally and substantially non-simultaneously as the valve is being closed even though the actual gradual process of closing once first engaged with the valve seat 22 could occur relatively quickly (for example, a small number of seconds).

Referring again to FIGS. 1, 2, and 6, the diaphragm valve 10 includes a flow-control assembly 200 to adjust the flow rate of fluid available through the diaphragm valve 10. More precisely, the flow-control assembly 200 controls the operating pressure of the valve. To accomplish this, the flow-control assembly 200 controls the maximum spacing between the diaphragm 20 and the valve seat 22 when the diaphragm valve 10 is in the open position. Increasing the spacing between the diaphragm 20 and the valve seat 22 will increase the flow rate through the valve seat 22, while decreasing the spacing between the diaphragm 20 and the valve seat 22 will decrease the flow rate through the valve seat 22. In this manner, the flow rate of fluid through the diaphragm valve 10 can be coordinated to the requirements of the irrigation system in which the diaphragm valve 10 is installed.

Flow-control assembly 200, in one form, is a non-rising type flow control and includes a handle 202, drive cylinder 204, and a translatable stop member 206. The drive cylinder 204 is disposed in an opening 208 defined by the handle 202, and the handle 202 matingly engages the drive cylinder 204 so that rotation of the handle 202 rotates the drive cylinder 204. The drive cylinder 204 includes an annular groove 210 supporting an o-ring or quad-ring 212 which seals the drive cylinder 204 with a bore 220 of the bonnet 16. The drive cylinder 204 has a threaded end 213 opposite the handle 202 and disposed at least partially within translatable stop member 206. In one form, only a few thread rotations are provided so that as the thread dimensions vary over time in the production/molding process the threads do not bind up. In one form, the threads are left-hand threads so that as the handle 202 is rotated clockwise, top looking down, the stop member 206 will be driven down to limit movement of the diaphragm 20.

The translatable stop member 206 further includes an interiorly threaded portion, such as a cylinder 214, that engages the threads of the drive cylinder 204. A ledge 216 extends radially outward from the cylinder 214 to a relatively wide cylindrical portion 218. It will be noted that the cylindrical portion 218 may have many different shapes as long as it is shaped to engage and retain the upward motion of a diaphragm, such as non-circular or solid, rather than cylindrical to name a few examples. The translatable stop member 206 is rotationally secured to the inside of the bore 220 within the bonnet 16 by projections extending outward from the cylinder 214 and into grooves in the bonnet 16 (or vice-versa) so that rotation of handle 202 simply translates into linear reciprocation of the stop member 206 without rotational movement.

The flow-control assembly 200, and specifically the cylindrical portion 218, defines a longitudinal axis A3 that, in one form, is aligned with the vertical axis A2 of the upper rim 44 of the component 20, the inlet chamber 40, and the outer perimeter 48 of the diaphragm 20. When the diaphragm 20 engages the cylindrical portion 218, and in one form the thickened portion 88, it does so in a non-concentric manner such that the longitudinal axis A3 of the flow-control assembly 200 valve seat 22 is offset from the vertical axis A1 of the valve seat 22 and center point C3 of the thickened portion 88 of the diaphragm. In this case, the vertical axis A1 and center point C3 are closer to the outlet side 54 of the upper rim 44 than the longitudinal axis A3. When the cylindrical portion 218 is set sufficiently low to engage the diaphragm 20, this configuration causes the cylindrical portion 218 to initially engage the diaphragm 20 on the inlet side 21 before engaging the diaphragm 20 on its outlet side 23 (FIG. 6). Thus, at least during the transition period between the open and closed positions, the cylindrical portion 218 may not contact the diaphragm's outlet side 23 due to the slanted orientation of the diaphragm 20 even though the cylindrical portion 218 still adequately limits further upward motion of the diaphragm 20 to obtain a desired maximum flow rate. Once the valve 10 stabilizes at a certain flow velocity, the diaphragm 20 may engage the entire circumference of the terminal end of the cylindrical portion 218. In this configuration, the diaphragm 20 would extend generally horizontal. In order to limit leakage of fluid out of the control chamber 24, the cylindrical portion 218 also has an annular groove 222 to support a seal such as an O-ring or quad-ring 224.

Figure 7:
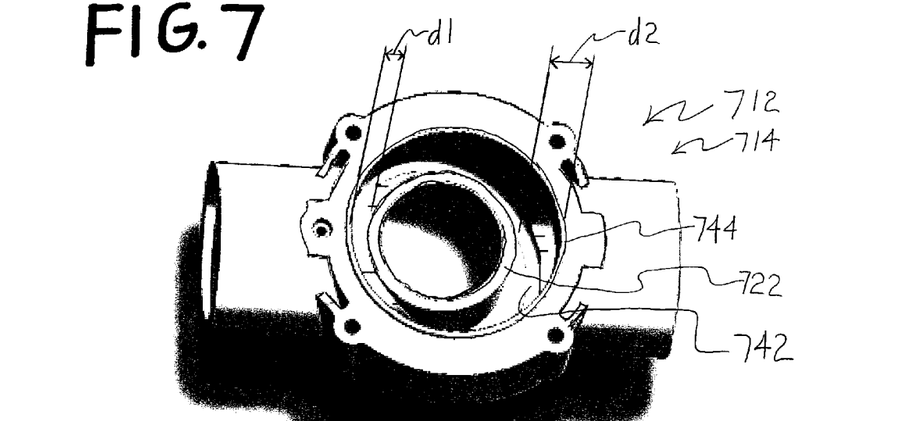
FIG. 7 is an upper perspective view of an alternative valve body component.

Referring to FIG. 7, an alternative valve body 714 does not include a flaring fin but, otherwise, generally has the same or similar features as valve body 14. These similar features include the offsets and a distance d1 on the outlet side shorter than a distance d2 on the enlarged inlet side (inlet entrance area) 742 between an upper rim 744 of the valve body 714 and a valve seat 722 to achieve the smooth, uniform flow, as well as the hinging action of the diaphragm. Here, the elements of valve body 714 similar to that on valve 10 are numbered similarly except with a "7" in front of the number.

Figure 8:
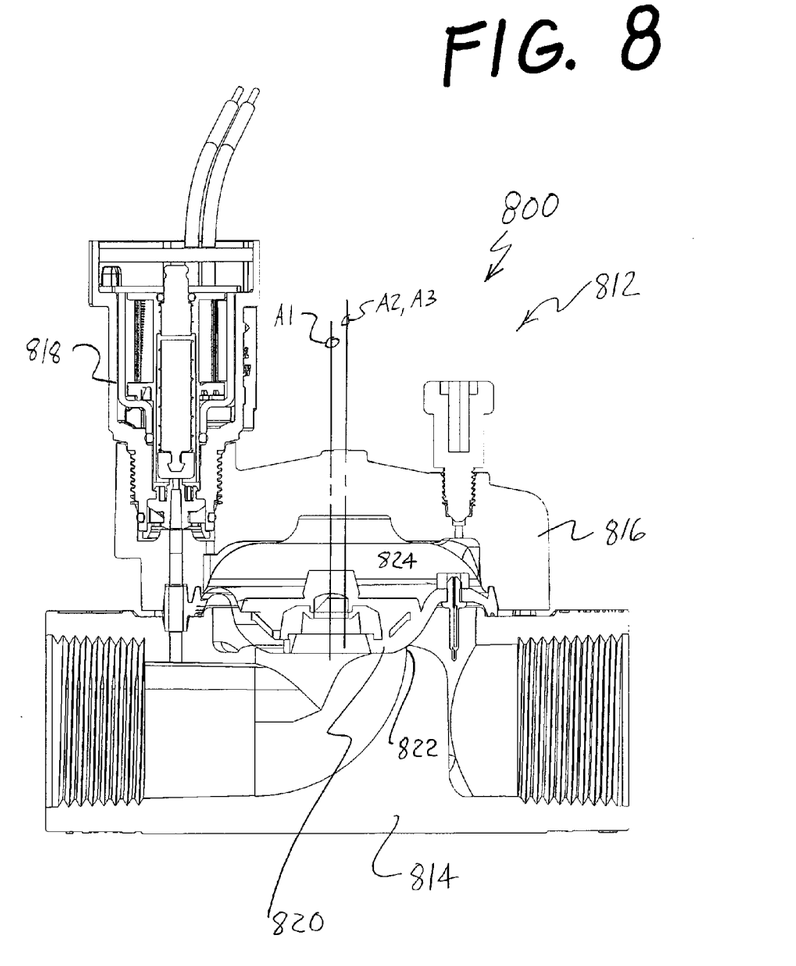
FIG. 8 is a side cross-sectional view of an alternative diaphragm valve for irrigation systems.

Referring to FIG. 8, an alternative diaphragm valve 800 does not include a flow-control assembly. Otherwise, elements of valve 800 similar to that on valve 10 are numbered the same except with an "8" placed in front of the reference number. Except for the features related to the flow-control assembly, valve 800 has the same or similar dimensions, offsets, and distances, and therefore benefits, as in valve 10.

While the foregoing describes specific examples, including presently preferred modes of carrying out the invention, those skilled in the art will appreciate that there are numerous variations and permutations of the above-described examples that fall with the scope of the following claims.

What is claimed is:

1. A valve comprising:
    an inlet passage having an inlet end;
    an outlet passage having an outlet end;
    a valve seat intermediate the inlet passage and outlet passage, the valve seat having a first vertical axis;
    an inlet chamber about the valve seat, the inlet chamber having a second vertical axis parallel to and offset from the first vertical axis, the first vertical axis being closer to the outlet end than the second vertical axis;
    a diaphragm configured to engage the valve seat;
    a control chamber disposed on an opposite side of the diaphragm from the valve seat and being in fluid communication with the inlet passage; and
    the first and second vertical axes are offset from one another a predetermined distance so that a first portion of the diaphragm closer to the inlet end lifts vertically off of the valve seat higher than a second portion of the diaphragm closer to the outlet end at least initially as the valve opens.

2. The valve of claim 1 further comprising an upper rim extending around the second vertical axis and forming a periphery of the inlet chamber, and wherein the upper rim and the valve seat are at least substantially circular.

3. The valve of claim 1 wherein the inlet chamber is at least partially annular and has an inlet side and an outlet side on an opposite side of the valve seat from the inlet side, and wherein the outlet side has a smaller cross-section than the inlet side.

4. An irrigation valve, comprising:
    a valve body having a valve component with an inlet passage, having an inlet end, an outlet passage having an outlet end, and a valve seat intermediate the inlet passage and the outlet passage, the valve seat extending at least substantially horizontal;
    a diaphragm having an outer perimeter and a thickened portion within the outer perimeter, the diaphragm arranged to engage and disengage the valve seat, the thickened portion having a first center point, the diaphragm having a second center point relative to the outer perimeter, the first center point being closer to the outlet end than the second center point;
    a control chamber disposed on an opposite side of the diaphragm from the valve seat and being in fluid communication with the inlet passage; and the first center point being offset from the second center point by a predetermined distance so that a first portion of the diaphragm closer to the inlet vertically off of the valve seat higher than a second portion of the diaphragm closer to the outlet end at least initially as the valve opens.

5. The valve of claim 4 wherein the thickened portion and the outer perimeter are at least substantially circular.

6. The valve of claim 4 wherein the thickened portion has a generally convex surface for engaging the seat.

7. The valve of claim 4 wherein the valve seat defines a third center point, the valve body comprises an upper rim configured to receive the outer perimeter of the diaphragm and defining a fourth center point offset from the third center point of the valve seat.

8. The valve of claim 7 wherein the first and second center points of the thickened portion and outer perimeter, respectively, are offset from one another a same distance as the third and fourth center points of the valve seat and the upper rim, respectively, are offset.

9. The valve of claim 4 wherein the valve body comprises:
an annular wall terminating at the valve seat and formed by an upwardly turned portion of the outlet passage; and
an upper rim adapted to receive at least a portion of the outer perimeter of the diaphragm and having an outlet side closer to the valve seat than an opposite inlet side is to the valve seat.

10. The valve of claim 9 wherein the valve body defines an inlet chamber surrounding the annular wall, the inlet chamber having a smaller cross-section between the valve seat and the upper rim toward the outlet end.

11. The valve of claim 4 wherein the valve seat has two opposite side portions and wherein the diaphragm is configured and disposed to gradually engage the valve seat from one side portion to the other side portion upon closing of the valve.

12. The valve of claim 4 comprising a flow-control assembly mounted on the valve body and having a stop member configured to move to non-concentrically and limit the travel of the diaphragm relative to the valve seat.

13. An irrigation valve comprising:
an inlet passage;
an outlet passage;
a valve seat intermediate the inlet passage and the outlet passage, the valve seat extending at least substantially horizontal and defining a first center point;
an upper rim about the valve seat and defining a second center point, the first center point being offset from the second center point;
an annular wall having the valve seat thereon with the annular wall formed by an upwardly turned portion of the outlet passage;
a projection extending upstream from the annular wall toward the inlet passage;
a diaphragm configured to engage the valve seat; and
a control chamber on an opposite side of the diaphragm from the valve seat, the fluid control chamber being in fluid communication with the inlet passage.

14. The irrigation valve of claim 13 wherein the inlet passage terminates at an inlet end, and the outlet passage terminates at an outlet end, and the first center point is closer to the outlet end than the second center point.

15. The irrigation valve of claim 14 wherein the upper rim comprises an outlet side and an opposite inlet side, and wherein the outlet side is closer to the valve seat than the inlet side.

16. A diaphragm for an irrigation valve comprising:
an outer perimeter;
a thickened portion within the outer perimeter and arranged to engage and disengage an at least substantially horizontally extending valve seat, the thickened portion having a first center point, the diaphragm having a second center point relative to the outer perimeter, the first center point being offset from the second center point; and
a web interconnecting the thickened portion to the outer perimeter, the web having an inlet side portion and an opposite outlet side portion with the inlet side portion being thicker than the outlet side portion.

17. The diaphragm of claim 16 wherein the outer perimeter has an outlet side and an opposite inlet side, and wherein the thickened portion is disposed closer to the outlet side than the inlet side.

18. The diaphragm of claim 17 wherein the offset is sufficient to cause the thickened portion and the web by the inlet side to lift off the valve seat higher than by the outlet side.

* * * * *

UNITED STATES PATENT AND TRADEMARK OFFICE
CERTIFICATE OF CORRECTION

| | | |
|---|---|---|
| PATENT NO. | : 8,740,177 B2 | Page 1 of 1 |
| APPLICATION NO. | : 13/250459 | |
| DATED | : June 3, 2014 | |
| INVENTOR(S) | : Samuel C. Walker | |

It is certified that error appears in the above-identified patent and that said Letters Patent is hereby corrected as shown below:

IN THE CLAIMS:

Column 11, line 3, in claim 4, after "inlet" insert --end lifts--.

Column 11, line 39, in claim 12, after "move" delete "to".

Column 12, line 43, in claim 18, after "off" insert --of--.

Signed and Sealed this
Twentieth Day of January, 2015

Michelle K. Lee
*Deputy Director of the United States Patent and Trademark Office*